July 15, 1969         J. L. BRENEMAN         3,455,035
VISUAL ASSOCIATION DEVICE AND METHOD OF OPERATING THE SAME
Filed Dec. 6, 1966                                       2 Sheets-Sheet 1
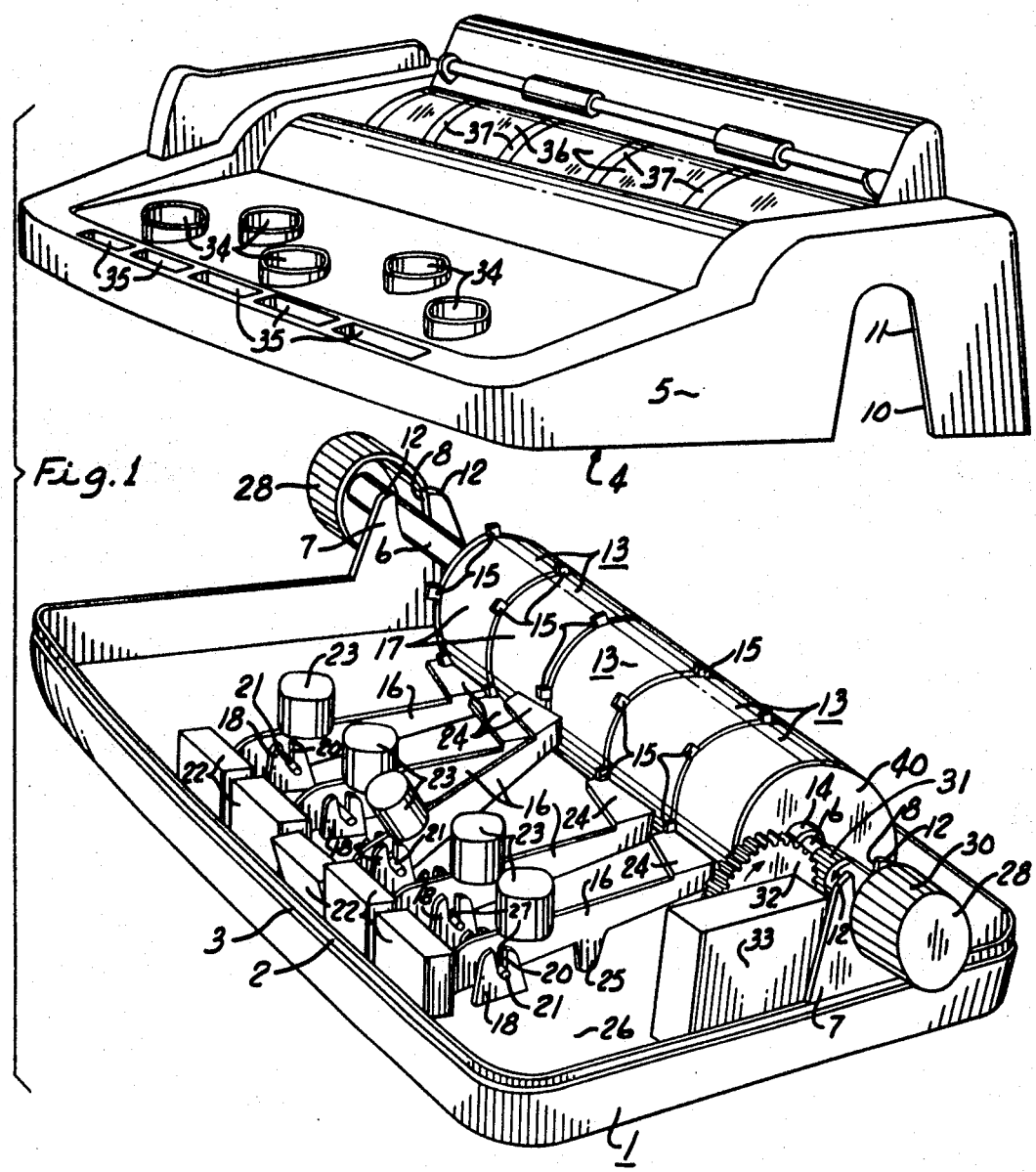
INVENTOR.
JACK L. BRENEMAN
BY
CAROTHERS & CAROTHERS
HIS ATTORNEYS July 15, 1969   J. L. BRENEMAN   3,455,035
VISUAL ASSOCIATION DEVICE AND METHOD OF OPERATING THE SAME
Filed Dec. 6, 1966   2 Sheets-Sheet 2
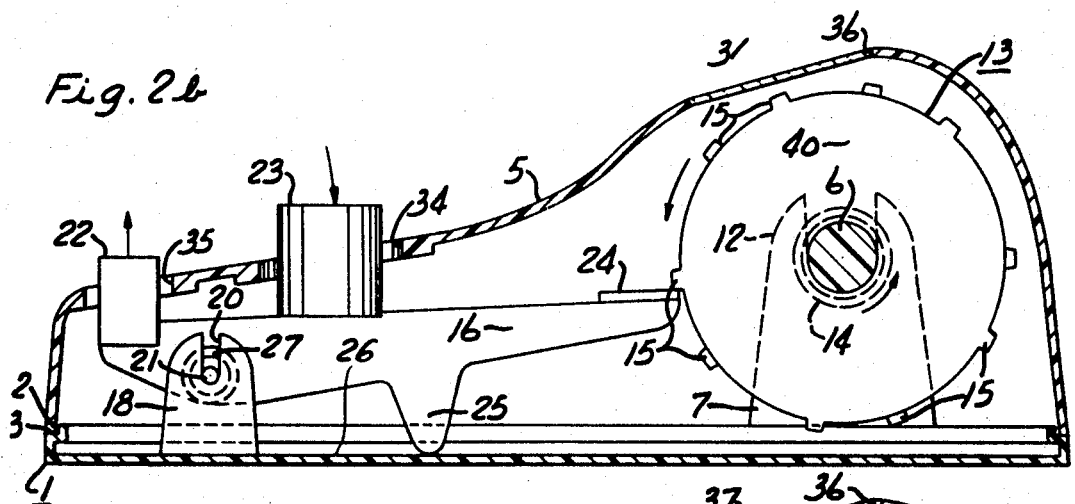
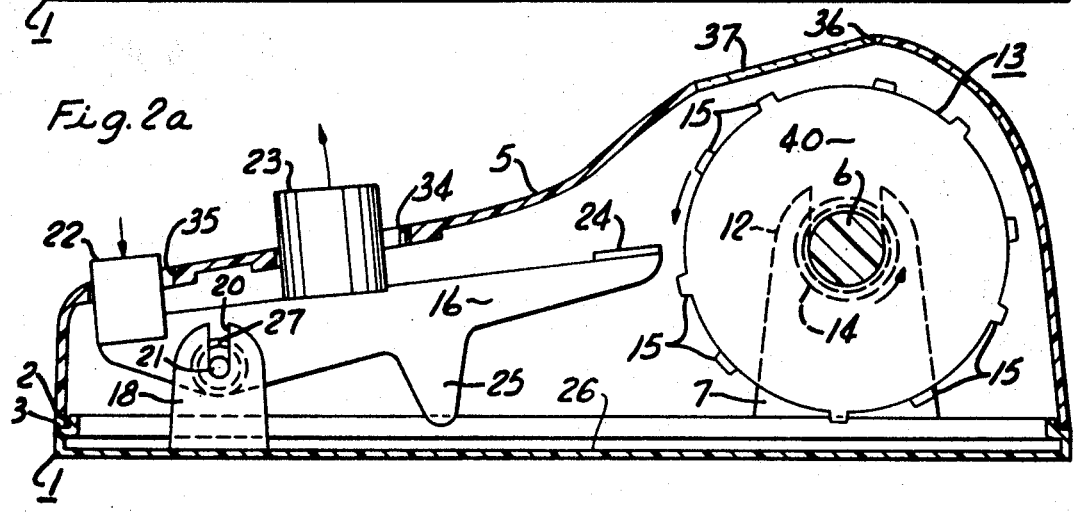
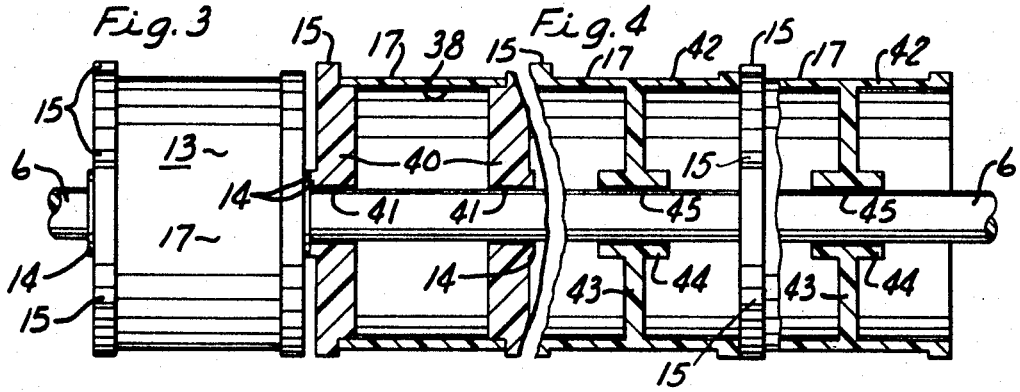
INVENTOR.
JACK L. BRENEMAN
BY
CAROTHERS & CAROTHERS
HIS ATTORNEYS

United States Patent Office 3,455,035
Patented July 15, 1969

3,455,035
VISUAL ASSOCIATION DEVICE AND METHOD OF OPERATING THE SAME
Jack L. Breneman, 9400 Babcock at Kummer Road, Allison Park, Pa. 15101
Filed Dec. 6, 1966, Ser. No. 599,571
Int. Cl. G09b *1/00, 5/00, 9/00*
U.S. Cl. 35—77  3 Claims

ABSTRACT OF THE DISCLOSURE

This invention relates generally to visual association devices which involve the principle of psychomotor coordination and speed and more particularly to those devices wherein the operator may activate selected levers in order to properly position in predetermined arrangement intelligence, having an interrelationship, in a visual display area of the device. The device comprises essentially a base member having a power operated axle supported on a pair of bifurcated mounts. A plurality of drums bearing indicia and a series of radially extending lugs are frictionally rotatably supported on the axle. A rocker arm for each drum is pivotally supported on another pair of bifurcated mounts, each rocker arm having a push button on each side of the pivot enabling the rocker arm to engage or release with a lug on the associated drum.

---

The principal object comprising this invention is the provision of a visual association device of an educational nature to teach, especially a child, to select an arrangement of pictorial display or intelligence to correspond to a proper intelligent inter-relationship. Such a selection is dependent upon the ability of the child to make a visual selection which registers in his mental faculties and thereafter physically respond by operating the proper lever in sufficient time to permit the selected pictorial display or intelligence to be positioned in the proper visual display area of the device. Thus, the device comprising this invention improves psychomotor coordination and speed, i.e., the ability of an operator of the device to carry out quickly and accurately a series of movements that require eye-hand coordination. This ability and resulting performance may be measured on the basis of time.

Another object comprising this invention is the provision of a visual association device including rotatably and adjacently supported drums on a power driven axle, driven by a gear train connected to a power drive means. The circumferential surfaces of the drums carry a series of pictorial representaations or other types of intelligence that may have a cooperative significance of inter-relationship with the pictorial representations or intelligence present on adjacent drums. For example, there may be a series of animals, with a different species of specific types of animals on each drum. The drums may also be selected to stop in the proper position to aline each of the drums relative to one another to provide visual display area wherein each pictorial representation selected will be of a single species of animals. Thus, a different type of bird may be depicted on each drum as well as different reptiles, mammals, fish, etc. The variations in pictorial representations to be used are unlimited. Other examples would be different vehicles, flowers, countries, vegetables and fruits, letters, words, etc.

Another object comprising this invention is the provision of a visual association device including radially disposed lugs in spaced relation on a peripheral edge of each of rotatably supported drums for engagement by a lever or rocker arm. Upon actuation of the rocker arm, the rocker arm end is brought into the path of the lugs as they are rotated with the drums on the power driven axle.

Engagement is made by the rocker arm end with a drum lug and further rotary movement of the drum engaged is repelled and stopped although the power driven axle may continue to rotate.

Another object comprising this invention is the provision of an educational device suitable to be employed as a toy for development of visual association to improve psychomotor coordination and speed selection in the associated intelligence disposed in a random arrangement on the surfaces of a series of independently, rotatably supported drums driven by a powered axle to permit; first, the selection of a predetermined arrangement of desired intelligence that is desired to appear in visual aligned relation; secondly, selection at the proper time the proper rocker arm button to position a drum, by stopping its rotation on the powered axle, to visually display the desired intelligence; thirdly, actuation of the lever at that proper time to stop the drum's rotation; and lastly, align associated intelligence on adjacent drums by selecting the proper rocker arm button and actuating the same until a complete selected positioning of all drums on the powered axle has been accomplished, to visably display the desired associated intelligence present on all the drums. The method of selection of the various levers or rocker arms may be done in any desired sequence and the feat or skill of making a complete desired selection of intelligence on the various drums in a final predetermined arrangement may be programed to be only accomplished in a set period of time. Thus, a spring-wound motor may be used as the power drive means to pre-set the desired period of time by winding up its main spring to a selected tension. The spring-wound motor will then drive the power axle only for the length of time selected.

Another object comprising this invention is the provision of a visual association device which may be utilized as a toy for purposes of amusement and at the same time improve one's physical motor and mental ability, mental alertness, response and judgment as well as over-all mental to physical motor adaptability.

Other objects and advantages appear hereinafter in the following description and claims.

The accompanying drawings show for the purpose of exemplification without limiting the invention or claims thereto, certain practical embodiments illustrating the principles of this invention wherein:

FIG. 1 is a perspective view showing the interior of the visual association device comprising this invention with the body cover unit of the toy removed.

FIG. 2a is a transverse cross-sectional view of the visual association device showing the rocker arm structure in its engagement position relative to the rotatably supported drums.

FIG. 2b is a transverse cross-sectional view of the visual association device showing the rocker arm structure in its engagement position relative to the rotatably supported drums.

FIG. 3 is a partial view illustrating the structure of the rotatably supported drums on the power driven axle with parts in section.

FIG. 4 is a partial view in cross-section illustrating a modification of the drum structure of FIG. 3.

Referring to FIG. 1 there is shown the visual association device comprising this invention having a base 1 with an upwardly extending perimetral side wall terminating in a perimetral flange 2 that forms the shoulder 3 to receive the bottom perimetral edge 4 of the body cover unit 5. The sealing of the body cover unit to the base 1 results in a flush continuous surface along the side edges of the assembled toy structure.

The visual association device comprising this invention has the general appearance of a typewriter and is provided with a power driven axle 6 which is supported from the base 1 by the axle supports 7. The supporters 7 are provided with a cut-out portion 8 to form bifurcated upper ends between which the axle 6 rests. The body cover unit 5 has corresponding openings 10 which has a perimetral edge 11 which fits over the outside of the edges 12 of the axle supports 7 to aid in maintaining the power driven axle 6 in the cut-out portion 8 upon assembling the body cover unit 5 to the base 1.

As shown in the figures, the drums 13 are rotatably supported on the axle 6 and thus are permitted to freely rotate on the power driven axle since they are in no way fastened or connected to the power axle 6. However, it should be noted that the rotatably supported drums 13 are provided with drum bearings 14 which have frictional contact with the bearing surfaces of the central power axle, 6. Upon rotation of the axle 6, the drums 13 will also rotate with the axle 6 due to the frictional contact between the inner surfaces of the drum bearings 14 and the cylindrical surface of the power axle 6.

As shown in FIG. 1, five rotatably supported drums 13 are shown. However, it is insignificant in the application of the present invention, the number of rotatably supported drums 13 to be utilized in the complete assembled toy, since any number of drums may be used. In fact, one may utilize a single drum which covers a substantial portion of the axle 6.

Each of the rotatably supported drums 13 are provided with the lugs 15 on one of the peripheral edges of the drum for engagement by the lever or rocker arms 16. Each of the drums 13 are provided with a corresponding actuating rocker arm 16 as shown in FIG. 1, which rocker arms are supported on the base 1 in a position substantially normal to the central axis of the rotary axle 6.

Each of the rotatably supported drums 13 is provided with a cylindrical surface area 17 for depicting a visual display upon which some form of intelligence may be placed for use in employment of the toy, which will be explained in further detail, hereinafter.

Each of the rocker arms 16 are supported from the base 1 on a pair of rocker arm supports 18 which are slotted as shown at 20, to provide bifurcated ends between which is provided a support for the pivot pin 21. Thus, the pivot pin 21 is secured to the rocker arm and provides a pivot or fulcrum point for the rocker arms 16.

It should be noted that the bifurcated rocker arm supports 18 need not be supported from the base 1 but rather may be supported from the underside of the cover unit 5. In such a case, an additional foot member, other than the foot member 25, as shown, may be provided immediately adjacent the bifurcated ends of the downwardly extending rocker arm supports to act as a rocking support for the rocker arms 16 retained between the supports 18 by the pivot pin 21.

Each of the rocker arms 16 are provided with two buttons, one of which is referred to as the drum release button 22 and the other of which is referred to as the drum engaging button 23. The drum release buttons 22 are provided on one side of the fulcrum point 20 and at the rearward end of each of the rocker arms 16, whereas the drum engaging buttons 23 are provided on the other side of the fulcrum point 20 substantially adjacent thereto.

The forward end of the rocker arm 16 is provided with a drum engaging member 24 which will, upon pressing the drum engaging button 23, be placed adjacent the cylindrical surface 17 of thhe drum 13 and will also be positioned in the path of the lugs 15 as they rotate on the drum on the power axle 6. The foot member 25 on the bottom portion of the rocker arms 16 limits the downward movement of the rocker arm upon pressing the drum engagement button 23 in order to maintain the rocker arms 15 with their drum engaging members 24 in the proper position to intersect a lug 15 as the lugs are rotated by the power axle 6. Thus, complete pressing of the drum engaging button 23 brings the end of the foot member 25 in engagement with the bottom 26 of the base 1.

In FIG. 2a there is illustrated the disengaging position of the rocker arm 16. In order to maintain the rocker arm in this disengaged position, it is necessary that a tight fit be provided at the pivot point 20 of each of the rocker arms 16 so that the rocker arms in the disengaging position will remain so until the member 24 is brought into engagement with a drum lug 15, upon actuation of the drum engaging button 23. This tension at the pivot point 20 may be provided by the spring 27 so that the rocker arm will remain in its completely disengaged position as shown in FIG. 2a or in its engaged position as shown in FIG. 2b. The spring 27 may be of either of the coil type or the disc type and provides the necessary practical tension by forcing the side of the rocker arms 16 against one of the rocker arm fulcrum supports 18.

It should be noted from FIG. 2b that drum engaging portion 24 of the rocker arm 16 does not stop the rotation of the drum 13 against the power axle 6. The end 24 rocker arm merely intercepts a rotating lug 15 and stops the rotation of the drum.

As shown in FIG. 1, the ends of the power axle 6 are provided with the knobs 28 which are knurled as shown at 30 in order to provide a gripping surface for hand rotation of the axle. The power driven axle 6 is also provided with an axle gear 31 which is in engagement with the power gear 32. The power gear 32 is rotatably driven by the spring wound motor or power unit 33 which is the typical spring wound motor found in wind-up devices of this type. The spring wound motor 33 drives the power gear 32 in the direction indicated by the arrow in FIG. 1, which in turn drives the power axle 6 through its gear 22 in the direction indicated by the arrow in FIG. 1. Since the power gear 32 is of a much larger diameter than the axle gear 31, and thus the power axle 6 will be driven at a much faster rate than the power gear 32.

The spring wound motor 33 has a main spring which is wound to tightness upon rotation of the axle 6 through the end knobs 28. Thus, the knobs are for winding up spring wound motor 33. The motor 33 is wound up spring tight by rotation of the wind-up knobs 28 in direction opposite to that shown by the arrow on the power axle 6, which arrow, as mentioned previously, depicts the direction of rotation of the axle 6, when being driven by the spring wound motor 33.

The axle gear 31, the power gear 32 and the spring wound motor 33 make up the power drive means for rotating the drums 13 on the power axle 6.

It should be realized that the power drive means for rotating the power axle 6 may include electrically operated motor which may be battery operated and provided with a switch to the electric motor to selectively turn the motor in off and on positions. Such a motor may be used in lieu of the spring wound motor 33 shown in FIG. 1.

The body cover unit 5 is provided to have the appearance of a typewriter and is provided with the apertures 34 to receive the corresponding drum engaging buttons 23. The cover body unit 5 is also provided with the openings 35 which permit the corresponding drum release buttons 22 to project upwardly through the body cover unit 5, as shown in FIG. 2b.

The upper and rearward top portion of the body cover unit 5 is provided with a series of viewing openings or windows 36 which may be separated by the separators 37. As depicted in FIGS. 2a and 2b, as well as FIG. 1, it will be understood that a portion of the cylindrical surface 17 of each of the drums will visually appear in each of the respective windows 36 while the window separators 37 will correspondingly cover or hide the peripheral lugs 15 on each of the drums 13. Thus, the only surface visually appearing through the provided windows 36 will be a select portion of the cylindrical surfaces 17.

As shown in FIG. 2b, the rocker arm foot 25 provides a stop for the rocker arms 16 in their full engagement position for engagement of lug 15 on the rotatably supported drums 13. The apertures 34 as well as the opening 35 provide a limit for the positional extent of the rocker arms in their disengaging position. FIG. 2a shows the rocker arm at its maximum height position.

As shown in FIG. 3, the rotatably supported drums 13 are provided with a cylindrical portion 38 which, as previously indicated, have the cylindrical surface 17 upon which intelligence may be inscribed or otherwise placed upon these surfaces. The drum ends 40 carry the drum bearings 14 and it will be noted upon viewing FIG. 3 that the central opening 41 through the drum ends are sufficiently large to permit independent rotation of the drums on the power axle 6, but at the same time, have a close clearance with the surface of the power axle 6 to insure frictional contact to produce a simple clutch feature wherein the drums will rotate with the rotation of the power axle 6 until their rotary motion is interrupted by the rocker arms 16.

The bearings 14 also provide the only contact between adjacent rotatably supported drums 13 and thus present the least amount of frictional engagement between adjacent rotary supported drums when the rotation of an adjacent drum has been prevented by its corresponding actuating rocker arm 16 engaging one of its respective stop lugs 15.

FIG. 4 illustrates a modification of the drum structure as shown in FIG. 3. In FIG. 4 the cylindrical portion 42 which carries the cylindrical surface 17 is supported for rotary movement on the axle 6 by the radial support members 43 which may be in the form of spokes or a single annulus. The radial support members 43 are in turn supported from the cylindrical bearing member 44 which is in engagement with the surface of the axle 6. The bearing member 44 rotatably supports the drum 13 of FIG. 4 but at the same time has a central opening 45 which is sufficiently large to permit the power axle to continuously rotate even though the drum 13 of FIG. 4 may be held from rotation on contact by the rocker arm engaging member 24 engaging one of the lugs 15.

For all practical purposes, it is not necessary that the lug engaging members 24 be employed in cooperative relationship with the peripheral lugs 15 on each of the drums 13 since other means may be used at the ends of the rocker arms 16 to selectively engage the drums 13 to stop their rotary movement relative to the power axle 6. An example of such means would be the employment of permanent magnets on the ends of the rocker arm 16. A series of metallic strips may be positioned or embedded at intervals across the drum surface 17, the major cylindrical portions 38 or 42 of the drums being constructed of non-magnetic material such as plastic. Upon pressing the drum engaging button 23, the magnets may be brought into close proximity with the surface 17 of the rotating drums 13 to magnetically attract a selected magnetic strip to stop and position the drum on the power axle in the position selected while the power axle continues to be rotatably driven by the power drive means.

Having described the structure comprising this invention, it should be readily understood that a series of pictorial representations or intelligence may be presented on each of the drum surfaces 17, wherein each pictorial representation or intelligence may have a cooperative significance or relation with corresponding pictorial representations or intelligence on adjacent rotatably supported drums. One may put into operation the series of selectiveness of displays, pictorial representations or intelligence which may be of associated significance with respect to the displays, pictorial representations, and intelligence on adjacent drums. Thus, a random selection of associated intelligence may be made from several rotatably supported drums with an added feature of employing a time period in which the selection of all associated pictorial representations or intelligence on each of the drums 13 must be properly positioned to appear through the viewing windows 36. The use of a time period improves one's psychomotor ability to first, properly determine the selection of intelligence which is desired to appear in the viewing windows; secondly, visually perceiving the selective intelligence on each of the respective drums as they rotate at random on the rotary power axle 6; thirdly, select and actuate the proper rocker arm drum engaging button 23 as the selected intelligence just initially appears in the viewing window 36 in order that the lug engaging member 24 of the selected rocker arm 16 will engage the proper sequential lug 15 on peripheral edge of the drum.

The steps of selecting the proper lever or rocker arm to properly position the desired intelligence in the window area of each of the drums and the step of actuating the rocker arm at the proper time to stop the rotary movement of the drum with the selected intelligence fully appearing through the window area are repeated for each of the rocker arms 16. To this method of arranging the selected intelligence on the drums 13, a specific time period may be added so that the desired arrangement in the window area of intelligence must be carried out in the time period provided. Since the spring wound motor 33 will unwind its main spring within a specific time period, selection must be made of the complete series of selected intelligence properly positioned in the window area before the spring wound motor 33 has expended its full energy stored in its main spring. The efficiency of selection of any selected arrangement may be improved by reducing the time period provided. Thus the spring wound motor 33 is not wound up to its full limit in order to provide a shorter time period in which the selection must be made of the desired intelligence on each of the respective rotatably supported drums to complete the full arrangement of all drums.

I claim:

1. A visual association device comprising a base having upwardly extended perimetral side walls terminating in a flange, a cover unit having a bottom perimetral edge to be received by said side wall flange to form a unitized enclosure, a series of pairs of bifurcated mounts extending upwardly from the bottom of said base, one of said pairs of bifurcated mounts adjacent to but in parallel alignment to the other of said pairs of bifurcated mounts to support a rotary axle, said axle held within one pair of mounts by said cover unit, at least two drums each having a cylindrical face with an arrangement of intelligence thereon rotatably supported on said axle, said drums in frictional engagement with but not secured to said axle, a series of radially extended lugs on a cylindrical face edge of each of said drums, power drive means to rotatably drive said axle and said drums supported thereon, a pivotally supported rocker arm for each of said other pairs of bifurcated mounts positioned transverse relative to said axle, a foot member on each of said rocker arms adjacent its point of pivoting and extending downwardly toward said base, a drum release push button and a drum engaging push button positioned on the top of each of said rocker arms, one on each side of the point of pivoting of said rocker arm, and a drum engaging member secured to the forward end of each of said rocker arms to engage selective of said drum lugs upon actuation of any of said drum engaging buttons with their foot members contacting said base to interrupt the rotational movement of said drums relative to said rotary axle.

2. A visual association device comprising a base having upwardly extended perimetral side walls terminating in a flange, a cover unit having a bottom perimetral edge to be received by said side wall flange to form a unitized enclosure, a series of pairs of bifurcated mounts extending upwardly from the bottom of said base, one of said pairs of bifurcated mounts adjacent to but in parallel alignment to the other of said pairs of bifurcated mounts to support a rotary axle, said axle held within said one pair of mounts by said cover unit, at least two drums each having a cylindrical face with an arrangement of intelligence thereon rotatably supported on said axle and having bearing surfaces to maintain said drums in spaced relation on said axle, said drums in frictional engagement with but not secured to said axle, a series of radially extended lugs on a cylindrical face edge of each of said drums, a spring wound motor supported on the bottom of said base, a power gear driven by said motor, an axle gear on said axle and interengaged with said power gear, said power gear of greater diameter than said axle gear, a pivotally supported rocker arm for each of said other pairs of bifurcated mounts positioned transverse relative to said axle, said rocker arms each pivotally supported in closer proximity to their rearward ends, a foot member extending downwardly toward said base from each of said rocker arms and positioned to be in closer proximity to the forward ends of said rocker arms, a drum release push button and a drum engaging push button positioned on the top of each of said rocker arms, one on each side of the point of pivoting of said rocker arm, and a drum engaging member secured to the forward end of each of said rocker arms to engage selective of said drum lugs upon actuation of any of said drum engaging buttons with their foot members contacting said base to interrupt the rotational movement of said drums relative to said rotary axle.

3. The visual association device of claim 2 characterized by spring means at said point of pivoting of each of said rocker arms.

References Cited

UNITED STATES PATENTS

| | | | |
|---|---|---|---|
| 317,815 | 10/1887 | Bodey | 273—143 X |
| 807,927 | 12/1905 | Henwood | 273—143 |
| 2,545,644 | 3/1951 | Benton et al. | 273—143 |
| 3,281,149 | 10/1966 | Miller | 273—143 |

EUGENE R. CAPOZIO, Primary Examiner

H. S. SKOGQUIST, Assistant Examiner

U.S. Cl. X.R.

273—143